Aug. 29, 1950 H. J. KOEBER, JR 2,520,843
FILM PROJECTION APPARATUS WITH PIVOTALLY
CONTROLLED CLAW FEED
Filed Dec. 27, 1948 2 Sheets-Sheet 2
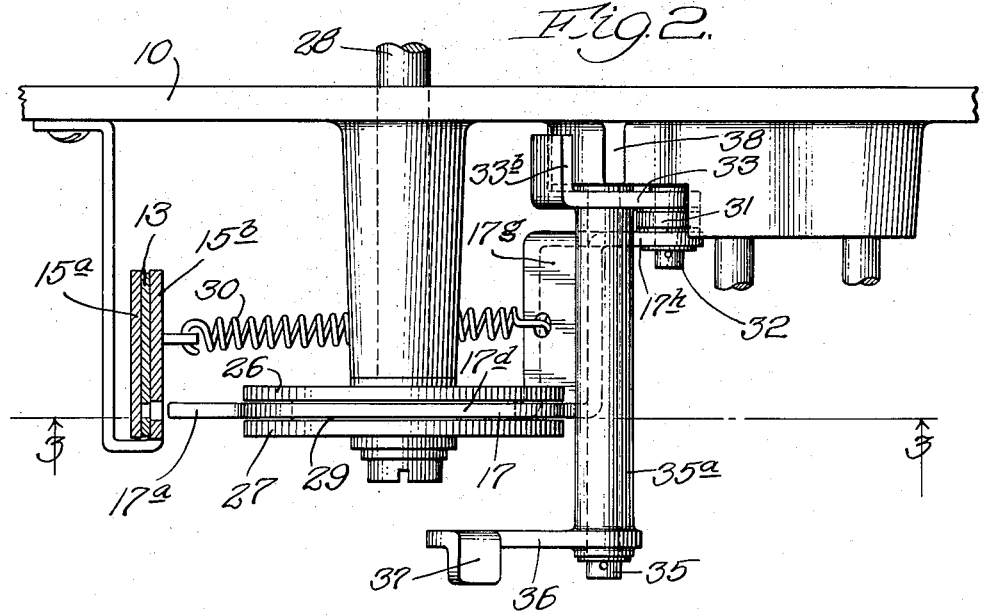
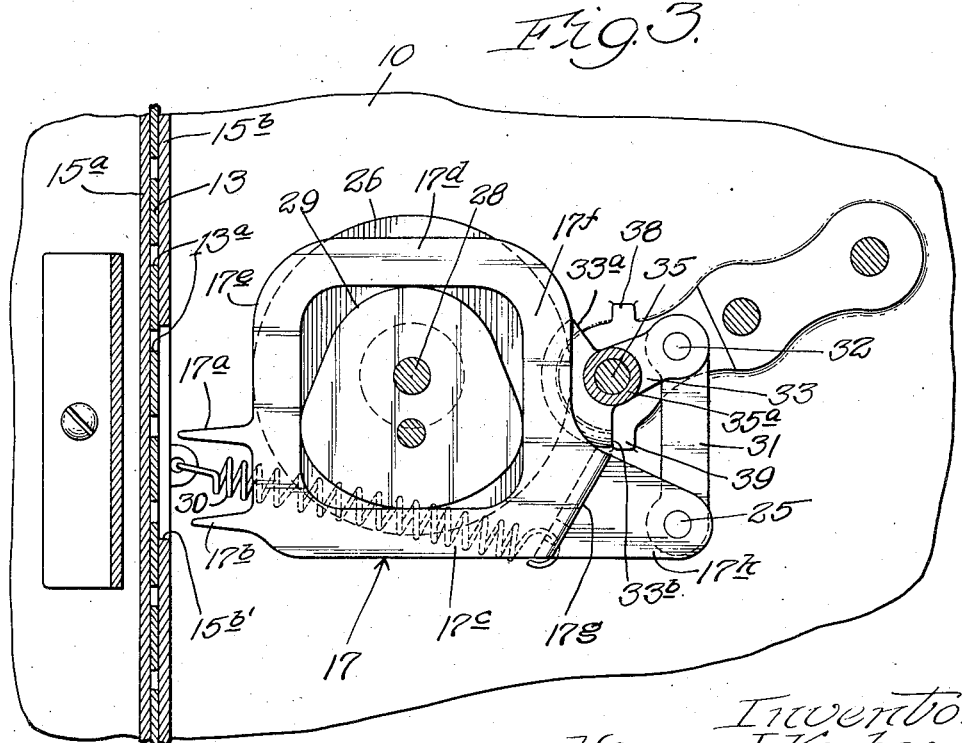

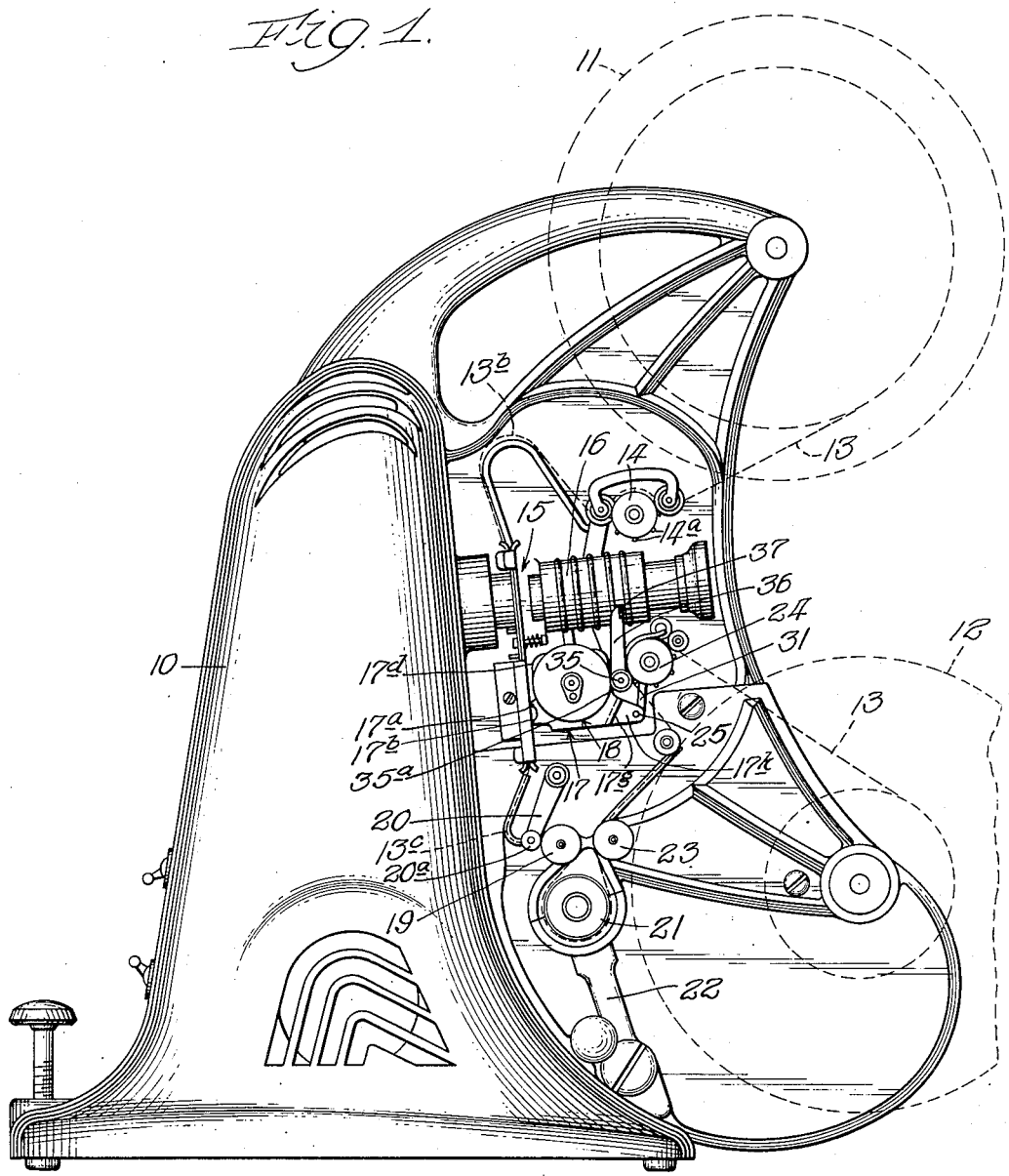

Patented Aug. 29, 1950

2,520,843

UNITED STATES PATENT OFFICE 2,520,843

FILM PROJECTION APPARATUS WITH PIVOTALLY CONTROLLED CLAW FEED

Henry J. Koeber, Jr., Chicago, Ill., assignor to Illinois Watch Case Co., a corporation of Illinois Application December 27, 1948, Serial No. 67,536

6 Claims. (Cl. 88—18.4)

This invention relates to film projection apparatus, and more particularly to improved apparatus for mounting the film-moving claw member on a film projector.

One feature of this invention is that it provides improved claw mounting apparatus; another feature of this invention is that it provides a claw mounting comprising a freely pivotal link supporting claw member, said link being mounted for translational movement on said projector to change the relative location on said projector of said claw to permit adjustment in the framing of the film; a further feature of this invention is that the link is pivotally connected at one end to the claw member and pivotally connected at the other end to a movable member, movement of said movable member imparting translational movement to said link to change the relative location on the projector of the pivotal connection between the link and the claw member; an additional feature of this invention is that it provides apparatus comprising a rotatable shaft having a crank thereon, said link being pivotally connected to the crank, and rotation of the shaft imparting translational movement to the link; still another feature of this invention is that stop means are provided for limiting the degree of rotation of the shaft so that the claw member is not shifted horizontally from its operating position.

Other features and advantages of this invention will be apparent from the following specification and from the drawings in which:

Fig. 1 is a side elevation of a sound film projector incorporating the invention;

Fig. 2 is an enlarged horizontal section through a portion of the projector of Fig. 1, showing the apparatus of the invention in top plan view; and Fig. 3 is a section taken along the line 3—3 of Fig. 2.

In the projector illustrated in Fig. 1 a casing 10 carries a film feed spool 11 and a film take-up spool 12, at least the take-up spool being driven in conventional manner, as by an electric motor (not shown) in the casing. A film 13 which is initially wound on the feed spool 11 is transferred to the take-up spool 12 during the operation of the projector. In its passage from the feed spool to the take-up spool the film passes over a sprocket 14 which has teeth 14a adapted to engage regularly spaced openings 13a along one edge of the film, and after leaving the sprocket 14 the film is fed past a film gate designated generally at 15 in Fig. 1 and having portions 15a and 15b as may be seen in Figs. 2 and 3. A projection lamp (not shown) within the casing 10 illuminates that portion of the film which is opposite the aperture in the gate 15 when a shutter on the gate is open, and a lens arrangement 16 is adapted to focus the beam of light on a screen.

Means are provided for causing the film to move intermittently past the gate so that each frame of the film is stationary during the time the shutter is open that light from the projection lamp is thrown upon the film. This means is illustrated in Fig. 1 as comprising a claw member designated generally at 17 driven by a cam arrangement designated generally at 18. After leaving the gate 15 the film passes over a roller 19, being held in frictional contact with said roller by a lever arm 20 which carries a supplemental roller 20a.

In the sound projector illustrated a sound drum 21 carries the now continuously moving film past the sound take-off apparatus which may comprise a translating device, as for example a photoelectric cell, housed in the sound drum 21 adjacent the sound track of the film 13, and a source of radiant energy (not shown) within a housing 22 on the projector on the other side of the film. In the conventional operation of a sound projector, waves developed by the source of radiant energy are modulated by the sound indications on the sound track, and these modulated waves strike the photoelectric cell and are translated into electrical energy. In the sound projector illustrated a transmitting device comprising an oscillator and an amplifier develops carrier waves which are modulated by the energy from the photoelectric cell, and the modulated carrier waves are transmitted to receiving and reproducing means which may comprise a conventional radio receiver.

After leaving the sound drum the film moves over another roller 23, over a take-up sprocket 24, and onto the take-up spool 12. Since the general operation of a sound projector is well known to the art, the operation of the projector illustrated will not be described in greater detail here.

The present invention relates to improved means for mounting the claw member 17 on the projector to permit normal operating movement of the claw movement and to permit adjustments in properly framing the film. Since the film is moving continuously as it passes over the sprocket 14, but must move intermittently past the gate 15, the film is formed into a free loop between the sprocket 14 and the gate 15 as shown at 13b, and another loop 13c between the gate and the roller 19 insures that the film is against continuously moving before it passes over the sound drum 21.

In order to provide for desired intermittent movement whereby the film frame of the film is stationary at least during the time that light from the projection lamp is thrown upon it the claw member 17 is operated by the cam apparatus 18 through a closed cycle. In the portion of the cycle illustrated in Fig. 1 the claw member 17 has just pulled a frame of the film into alignment with the aperture in the gate 15, claws or tines 17a and 17b on said claw member entering an aperture 15b' in the gate portion 15b and entering openings 13a in the film in order to engage the film to complete this operation. During the operation of the projector the cam structure 18 causes the claw member 17 to move horizontally forwardly of the projector or to the right (as the parts are positioned in the drawing) so that the claws or tines 17a and 17b are withdrawn from engagement with the film. After moving the claw member to the right out of engagement with the film the cam structure 18 causes the claw member 17 to pivot about its pivotal mounting point 25 so that the tines 17a and 17b move upwardly, still out of engagement with the film, and at the next phase of the cycle of operation the claw moves horizontally rearwardly of the projector or to the left, the tines 17a and 17b entering two adjacent openings 13a of the film. When the claw member pivots downwardly to the position of Fig. 1 the film is pulled downwardly so that the next succeeding frame is in alignment with the aperture in the gate. The operation of the gate is synchronized with the operation of the claw so that the shutter is closed and light from the projection lamp is blocked from the film during the time the film is moving.

Referring more particularly to Figs. 2 and 3, the cam structure 18 comprises a pair of discs 26 and 27 mounted on a shaft 28 and carrying between them a cam 29 having a surface adapted to cooperate with the inner cam follower surface of the generally block O shaped body portion 17c of the claw member to produce the operational cycle earlier described. The body portion of the claw comprises spaced parallel bottom and top sides designated at 17c and 17d, respectively and spaced parallel front and rear sides 17e and 17f respectively, the tines 17a and 17b projecting from the front side 17e near the bottom thereof. The claw member is urged into engagement with the film by means of a spring 30 having one end attached to the gate portion 15b and the other end attached to the claw member 17 adjacent the lower rear corner thereof. The claw member 17 has an offset portion 17g adjacent the juncture of the sides 17d and 17f and terminates in a forwardly extending mounting portion 17h pivotally supported at 25, this mounting portion being at the other end of the claw from the tines 17a and 17b, and the cam 29 operating within the block O between said ends of the claw member.

It has heretofore been the practice to provide a claw member having a slot at its back end and to provide a stud in the slot for the pivotal mounting of the claw, said stud being threaded on a mounting bracket or otherwise being movable to allow for adjustment in framing during the operation of the projector so that each frame is aligned with the aperture in the gate. The apparatus disclosed herein provides a novel mounting comprising an improvement over the conventional mounting apparatus while at the same time permitting the normal pivotal cyclical operation of the claw member and providing that framing may be accomplished merely by finger pressure at any time during the operation of the projector.

At the end of the mounting portion 17h the claw member is pivotally connected at 25 to a link 31, the other end of the link being pivotally connected at 32 to a crank 33 which has an arm portion to which the link is pivotally connected and a portion providing a pair of angularly facing stop shoulders 33a and 33b. The crank 33 is mounted on a sleeve 35a carried by a rotatable shaft 35 extending from the projector and carrying a lever 36 having a finger button 37 for manual rotation of the shaft. A pair of lugs 38 and 39 cooperate with the shoulders 33a and 33b to provide a stop to limit the rotation of said shaft in both directions, said shaft preferably being limited to an angular rotation of the order of 35 degrees.

It will be seen from a consideration of Fig. 3 that while one end of the link 31 is pivotally connected to the claw member, the other end of the link is pivotally movable during normal operation of the projector and the link is at the same time mounted for translational movement on the projector to change the relative location on the projector of the pivotal connection between the link and the claw member, since the upper end of the link is pivoted on a movable member. In the operation of the projector if the framing is incorrect so that a portion of two frames on the film are aligned with the aperture in the gate 15, finger pressure on the lever 36 will rotate the shaft 35, moving the arm portion of the crank 33 and imparting translational movement to the link to change the vertical location of the pivot point 25.

By limiting the angle of rotation of the shaft 35 through an angle of the order of 35 degrees, I assure that the translational movement of the link 31 is in a substantially straight line, and consequently there is no danger that the claw will be moved horizontally beyond its operating limits with the consequent probability of damaging the film, or (if the claw were moved too far to the right) of failing to engage the film during each cycle of operation of the claw member.

In addition, while providing improved results, the mounting apparatus described simplifies the manufacture of the projector since most of the parts may comprise stampings.

While I have shown and described certain embodiments of my invention it is to be understood that it is capable of many modifications. Changes, therefore, in the construction and arrangement may be made without departing from the spirit and scope of the invention as disclosed in the appended claims.

I claim:

1. In a film projector having a gate and a cam operated member having a claw at one end for moving said film intermittently past said gate, means for mounting said member on said projector, comprising: a link having one end pivotally connected to said member adjacent the other end thereof for pivotal movement about an axis which is fixed with reference to said member, said cam operating between said ends of said member; and a movable member mounted on said projector and having the other end of said link pivotally connected thereto for pivotal movement during normal operation of said projector, movement of said movable member imparting translational movement to said link to change the relative location on said projector of said first mentioned pivotal connection.

2. In a film projector having a gate and a claw member for moving said film intermittently past said gate, means for mounting said member on said projector, comprising: a link having one end pivotally connected to said member adjacent the other end thereof; a rotatable shaft on said projector; a crank mounted on said shaft and pivotally connected to the other end of said link, rotation of said shaft imparting translational movement to said link to change the relative location on said projector of said first mentioned pivotal connection; and apparatus connected directly to the shaft for manually rotating said shaft.

3. In a film projector having a gate and a claw member for moving said film intermittently past said gate, means for mounting said member on said projector, comprising: a link having one end pivotally connected to said member adjacent the other end thereof; a rotatable shaft on said projector; a crank mounted on said shaft and pivotally connected to the other end of said link, rotation of said shaft imparting translational movement to said link to change the relative location on said projector of said first mentioned pivotal connection; and a stop comprising shoulders on said crank on opposite sides of said shaft for limiting the rotation of said shaft.

4. In a film projector having a gate and a cam operated member having a claw at one end for moving said film intermittently past said gate, means for mounting said member on said projector, comprising: a link having one end connected to said member adjacent the other end thereof for pivotal movement about an axis which is fixed with reference to said member, said cam operating between said ends of said member; a rotatable shaft on said projector; a crank mounted on said shaft and pivotally connected to the other end of said link, rotation of said shaft imparting translational movement to said link to change the relative location on said projector of said first mentioned pivotal connection; apparatus for manually rotating said shaft; and a stop for limiting the rotation of said shaft, the shaft being yieldably held between the extreme limits of said stop for instantaneous movement between said limits upon operation of the manual apparatus.

5. In a film projector having a gate and a cam operated member having a claw at one end for moving said film intermittently past said gate, means for mounting said member on said projector, comprising: a link having one end pivotally connected to said member adjacent the other end thereof, said cam operating between said ends of said member; a rotatable shaft on said projector; a crank mounted on said shaft, said crank having a portion adjacent the shaft providing at least one stop shoulder, and said crank having an arm portion pivotally connected to the other end of said link, rotation of said shaft imparting translational movement to said link to change the relative location on said projector of said first mentioned pivotal connection; a lever on said shaft for manually rotating said shaft; and at least one lug on said projector adjacent the shaft, said lug cooperating with said shoulder to provide a stop for limiting the rotation of said shaft in both directions.

6. In a film projector having a gate and a cam operated member having a claw at one end for moving said film intermittently past said gate, means for mounting said member on said projector, comprising: a link having one end connected to said member adjacent the other end thereof for pivotal movement about an axis which is fixed with reference to said member, said cam operating between said ends of said member; a rotatable shaft on said projector; a crank mounted on said shaft, said crank having a portion providing a pair of angularly facing stop shoulders, and said crank having an arm portion pivotally connected to the other end of said link, rotation of said shaft imparting translational movement to said link to change the vertical location on said projector of said first mentioned pivotal connection; a lever on said shaft for manually rotating said shaft, said lever being rotatable about the axis of said shaft; and a pair of lugs on said projector, said lugs cooperating with said shoulders to provide a stop for limiting the rotation of said shaft through an angle of the order of 35 degrees.

HENRY J. KOEBER, Jr.

REFERENCES CITED

The following references are of record in the file of this patent:

UNITED STATES PATENTS

| Number | Name | Date |
| --- | --- | --- |
| 2,233,839 | Heurtier | Mar. 4, 1941 |
| 2,281,726 | Stechbart | Mar. 5, 1942 |
| 2,335,435 | Morgan et al. | Nov. 30, 1943 |

Certificate of Correction

Patent No. 2,520,843 August 29, 1950

HENRY J. KOEBER, Jr.

It is hereby certified that error appears in the printed specification of the above numbered patent requiring correction as follows:

Column 2, line 54, for the word "against" read *again*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*